United States Patent
Das et al.

(10) Patent No.: US 11,374,917 B2
(45) Date of Patent: Jun. 28, 2022

(54) PREVENTION OF TOKEN AUTHENTICATION REPLAY ATTACKS SYSTEM AND METHOD

(71) Applicant: Visa International Service Association, San Francisco, CA (US)

(72) Inventors: Kriti Ranjan Das, Singapore (SG); Tirtha Mauli Sarkar, Singapore (SG)

(73) Assignee: Visa International Service Association, San Francisco, CA (US)

( * ) Notice: Subject to any disclaimer, the term of this patent is extended or adjusted under 35 U.S.C. 154(b) by 135 days.

(21) Appl. No.: 16/752,433

(22) Filed: Jan. 24, 2020

(65) Prior Publication Data
US 2021/0234852 A1    Jul. 29, 2021

(51) Int. Cl.
*H04W 12/06*    (2021.01)
*H04L 9/40*    (2022.01)

(52) U.S. Cl.
CPC ........ *H04L 63/0807* (2013.01); *H04L 63/083* (2013.01); *H04L 63/0853* (2013.01); *H04L 63/102* (2013.01); *H04W 12/06* (2013.01)

(58) Field of Classification Search
CPC ............ H04L 63/0853; H04L 63/0807; H04L 63/083; H04L 63/102; H04W 12/06
See application file for complete search history.

(56) References Cited

U.S. PATENT DOCUMENTS

| 9,033,218 | B1* | 5/2015 | Batra | G06Q 20/341 |
| | | | | 235/375 |
| 9,342,832 | B2* | 5/2016 | Basu | G06Q 20/385 |
| 2005/0271209 | A1* | 12/2005 | Sahasrabudhe | H04L 9/0844 |
| | | | | 380/270 |

(Continued)

FOREIGN PATENT DOCUMENTS

WO    2012089953    7/2012

OTHER PUBLICATIONS

T. Emadinia, F. Fatemi Moghaddam, P. Wieder, S. Dabbaghi Varnosfaderani and R. Yahyapour, "An Updateable Token-Based Schema for Authentication and Access Management in Clouds," 2019 7th International Conference on Future Internet of Things and Cloud (FiCloud), 2019, pp. 50-56. (Year: 2019).*

(Continued)

*Primary Examiner* — Kari L Schmidt
(74) *Attorney, Agent, or Firm* — Kilpatrick Townsend & Stockton LLP

(57) ABSTRACT

A method including receiving, by a server computer, a request message from a token requestor computer on behalf of a user device. The request message comprising a first current token tracking value and a first function index value. The server computer can determine a second function index value. The server computer can then compare the first function index value to the second function index value. If the first function index value and the second function index value match, the server computer can determine a function based on the first function index value and a stored function table associated with the user device. The server computer can then determine a second current token tracking value based on the function, then compare the first current token tracking value to the second current token tracking value. The server computer can generate a response message in response to the comparing.

19 Claims, 5 Drawing Sheets

(56) References Cited

U.S. PATENT DOCUMENTS

| | | | |
|---|---|---|---|
| 2007/0256123 A1* | 11/2007 | Duane | H04L 63/1441 726/6 |
| 2008/0077795 A1 | 3/2008 | Macmillan | |
| 2009/0282243 A1* | 11/2009 | Rose | H04L 63/0435 713/159 |
| 2010/0027786 A1 | 2/2010 | Faith et al. | |
| 2010/0083386 A1* | 4/2010 | Kline | G01R 31/31705 726/34 |
| 2010/0205448 A1* | 8/2010 | Tarhan | G06F 21/33 713/185 |
| 2010/0293381 A1* | 11/2010 | Hammad | G06Q 20/425 713/172 |
| 2010/0293382 A1* | 11/2010 | Hammad | H04L 9/3234 713/173 |
| 2010/0327054 A1* | 12/2010 | Hammad | G06Q 20/12 235/375 |
| 2012/0018506 A1* | 1/2012 | Hammad | G06Q 30/06 235/375 |
| 2013/0226802 A1 | 8/2013 | Hammad et al. | |
| 2017/0200165 A1* | 7/2017 | Laxminarayanan | G06Q 20/401 |
| 2017/0228723 A1 | 8/2017 | Taylor et al. | |
| 2018/0352438 A1 | 12/2018 | Powell et al. | |
| 2019/0197251 A1* | 6/2019 | Balijepalli | G06F 21/31 |
| 2021/0014221 A1* | 1/2021 | Kukreja | H04L 63/0815 |

OTHER PUBLICATIONS

Sun, Haiyou, and Sheng Xiao. "DNA-X: Dynamic Network Authentication using SGX." Proceedings of the 2nd International Conference on Cryptography, Security and Privacy. 2018, pp. 110-115. (Year: 2018).*

P. Tanvi, G. Sonal and S. M. Kumar, "Token Based Authentication Using Mobile Phone," 2011 International Conference on Communication Systems and Network Technologies, 2011, pp. 85-88. (Year: 2011).*

K. Kaur, S. Garg, G. Kaddoum, M. Guizani and D. N. K. Jayakody, "A Lightweight and Privacy-Preserving Authentication Protocol for Mobile Edge Computing," 2019 IEEE Global Communications Conference (GLOBECOM), 2019, pp. 1-6,. (Year: 2019).*

"How to Prevent Replay Attacks When Using Token Based Authentification in an HTTP Connection", Stack Overflow, Available online at: https://stackoverflow.com/questions/43327829/how-to-prevent-replay-attacks-when-using-token-based-authentification-in-an-http, Accessed from Internet on Jan. 28, 2020, 2 pages.

EP21152617.3 , "Extended European Search Report", dated May 18, 2021, 6 pages.

* cited by examiner

PREVENTION OF TOKEN AUTHENTICATION REPLAY ATTACKS SYSTEM AND METHOD

BACKGROUND

A replay attack during token authorization is a phenomenon where an attacker performs a man in the middle attack to compromise a token, and then later uses the token to obtain authorization. In some cases, the attacker can use various channels (e.g., phishing email, social media, internet adds, etc.) to establish a connection with a user device (e.g., a host) which they will ultimately attempt to compromise via the replay attack. This allows the attacker to snoop into secured data of the host and use it for the attacker's own purpose. When the host initiates a token authorization (e.g., in-app or online based token authorization) a copy of a secured cryptogram is stolen by the attacker. The secured cryptogram contains the encrypted credentials of the user device that is validated and authenticated by an authorizing entity to approve the interaction. The attacker then uses the same secured data and initiates authorizations. This is a form of identity theft where the identity of the user is compromised and used by attackers to perform a theft. These attacks have increased with the increase in token authorizations.

Embodiments of the disclosure address this problem and other problems individually and collectively.

SUMMARY

Embodiments are related to methods and systems of preventing replay attacks (e.g., for token authentication).

One embodiment is related to a method comprising: receiving, by a server computer, a request message from a user device, the request message comprising a first current token tracking value and a first function index value; determining, by the server computer, a second function index value; comparing, by the server computer, the first function index value to the second function index value; if the first function index value and the second function index value match, determining, by the server computer, a function based on the first function index value and a stored function table associated with the user device; determining, by the server computer, a second current token tracking value based on the function; comparing, by the server computer, the first current token tracking value to the second current token tracking value; and generating, by the server computer, a response message in response to the comparing.

Another embodiment is related to a server computer comprising: a processor; and a computer-readable medium coupled to the processor, the computer-readable medium comprising code executable by the processor for implementing a method comprising: receiving a request message from a user device, the request message comprising a first current token tracking value and a first function index value; determining a second function index value; comparing the first function index value to the second function index value; if the first function index value and the second function index value match, determining a function based on the first function index value and a stored function table associated with the user device; determining a second current token tracking value based on the function; comparing the first current token tracking value to the second current token tracking value; and generating a response message in response to the comparing.

Further details regarding embodiments of the disclosure can be found in the Detailed Description and the Figures.

DETAILED DESCRIPTION

Figure 1:
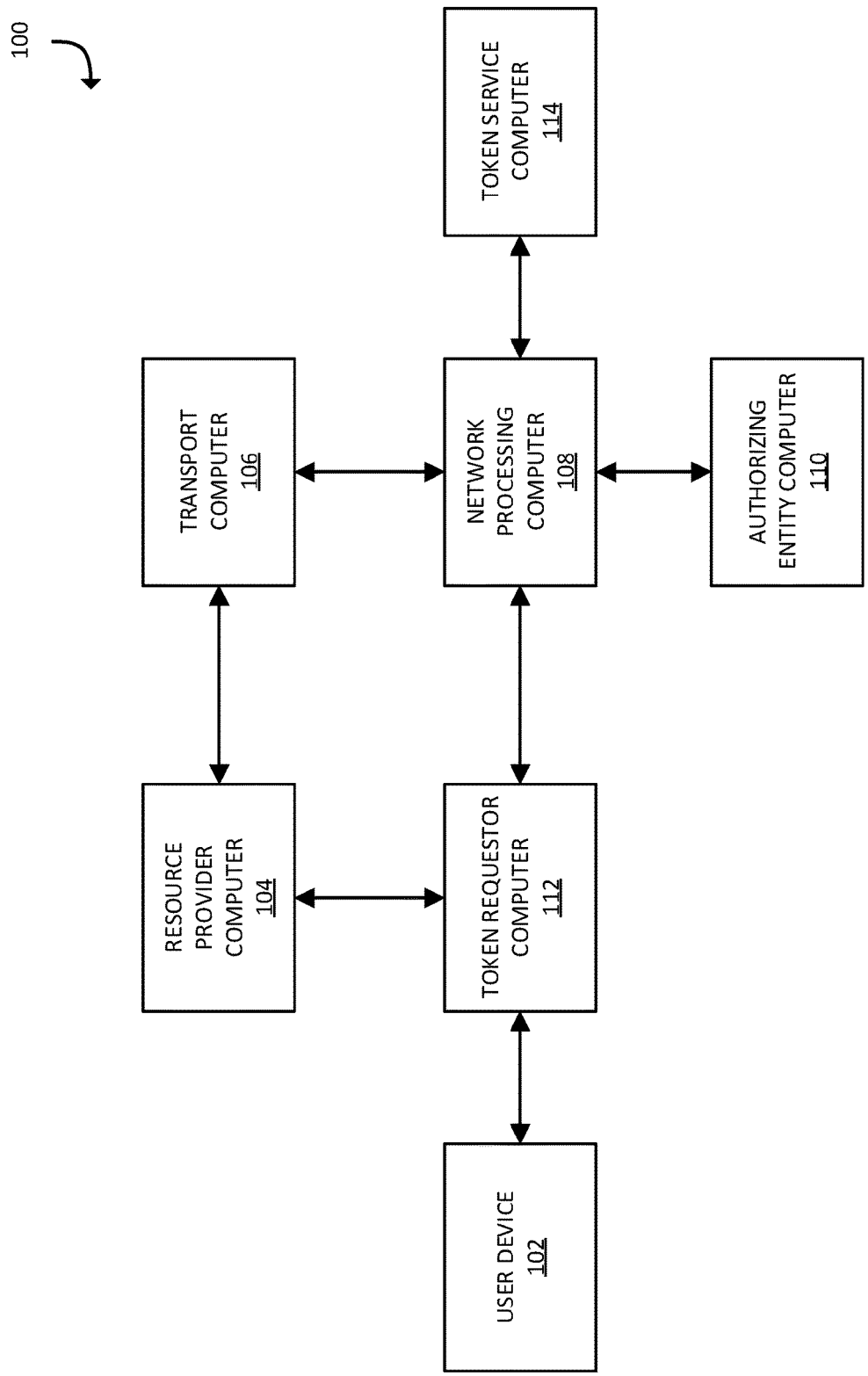
FIG. 1 shows a block diagram of a replay attack prevention system according to embodiments.

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. There are a variety of input sensors capable of detecting user input, such as accelerometers, cameras, microphones, etc. The user input obtained by the input sensors may be from a variety of data input types, including audio data, visual data, biometric data, etc. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "user identifier" can include any piece of data that can identify a user. A user identifier can comprise any suitable alphanumeric string of characters. In some embodiments, the user identifier may be derived from user identifying information. In some embodiments, a user identifier can include an account identifier associated with the user.

The term "verification" and its derivatives may include a process that utilizes information to determine whether an underlying subject is valid under a given set of circumstances. Verification may include any comparison of information to ensure some data or information is correct, valid, accurate, legitimate, and/or in good standing.

A "resource provider" may be an entity that can provide a resource such as goods, services, information, and/or access. Examples of resource providers includes merchants, data providers, transit agencies, governmental entities, venue and dwelling operators, etc.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices and/or entities can interact to facilitate a payment.

An "authorization request message" may be an electronic message that requests authorization for an interaction. In some embodiments, the authorization request message can be sent to a network processing computer and/or an authorizing entity computer to request authorization for an interaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a token, a user name, an expiration date, etc. An authorization request message may also comprise interaction information, such as any information associated with a current interaction, such as a transaction value, a merchant identifier, a merchant location, an acquirer bank identification number (BIN), a card acceptor ID, information identifying items being purchased, etc., as well as any other information that may be utilized in determining whether to identify and/or authorize the interaction.

An "authorization response message" may be a message that responds to an authorization request message. In some cases, it may be an electronic message reply to an authorization request message generated by an authorizing entity computer or a network processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the network processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" can include a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a PAN) may be tokenized by replacing the primary account identifier with a substitute number (e.g. a token) that may be associated with the payment account identifier.

A "token provider" or "token service computer" can include a system that services payment tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "digital wallet" may include an electronic module that allows a device to make electronic commerce transactions. In some embodiments, a digital wallet may store account information (e.g., bank account numbers, PANs, etc.) associated with a user. A digital wallet may be associated with, or store, one or more unique asymmetric key pairs, a TAVV, or the like, in at least one embodiment, a digital wallet may store, or otherwise access a token. Such digital wallets may, in some embodiments, be configured to encrypt transaction information (e.g., account data, etc.) utilizing a private key, a TAVV, a token, or the like. In some embodiments, a digital wallet may be a digital wallet application, for example, a digital wallet application stored on a user device.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" can include the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include credentials, mobile device identification information (e.g., a phone number or MSISDN), a digital wallet identifier, information identifying a tokenization service provider, a merchant identifier, a cryptogram, and/or any other suitable information. Information included in a token request message can be encrypted (e.g., with an issuer-specific key).

A "token response message" may be a message that responds to a token request. A token response message may include an indication that a token request was approved or denied. A token response message may also include a payment token, mobile device identification information (e.g., a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "token tracking value" can include a value that can correspond to a state of a token. A token tracking value can include any suitable type of number of characters (e.g., 3, 5, 6, etc.). In some embodiments, a token tracking value can be a current token tracking value (e.g., a first current token tracking value, a second current token tracking value, etc.). In some embodiments, a token tracking value can be a control token tracking value (e.g., a first control token tracking value, a second control token tracking value, etc.).

A "current token tracking value" can include a changing value which tracks whether or not an associated token used in an interaction is valid. A current token tracking value can be an identifier associated with a token. For example, a current token tracking value can be a verification value submitted with a payment token or payment credentials of a payment account. In some embodiments, a current token tracking value may be 3, 4, 5 or more characters in length. In some embodiments, a current token tracking value can be generated based on one or more data elements. The inputs for a current token tracking value can include a function index value, a function, and a control token tracking value. In some embodiments, both a current token tracking value and a control token tracking value can be utilized during an interaction, as described in embodiments below.

A "control token tracking value" can include a token tracking value that is sent or received prior to a current token tracking value. A control token tracking value can be paired with a current token tracking value. In some embodiments, a control token tracking value can be a value which is used to generate a current token tracking value.

A "function" can include a relationship or expression involving one or more variables. A function can accept an input, performing suitable processing, and return an output. A function can include any suitable mathematical relations. An example function can include accepting an input value, multiply the input value by a predetermined constant, multiply the result by a second predetermined constant, and then truncating the ending value to include 4 digits, yielding the output value.

A "function pool" can include a data item comprising a plurality of functions. For example, a function pool can include 100 functions, however, it is understood that the function pool can include any suitable number of functions (e.g., 200, 300, 500, 1,000, 10,000 functions, etc.). In some embodiments, a function pool can be generated by an authorizing entity computer and subsequently provided to a network processing computer for further use. In other embodiments, the network processing computer can generate the function pool locally.

A "function table" can include a table comprising a subset of functions of a function pool. For example, a function table can include 10 functions of a function pool which comprises 100 functions.

A "function index value" can include an index value associated with a function's position or location in a function table. A function index value may indicate a function of a function table, the indicated function may be used to determine a current token tracking value from a control token tracking value.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

I. INTRODUCTION

Embodiments of the disclosure provide a token authentication and tracking model to prevent replay attacks in token authorizations. Methods and systems described herein, detail a way to establish uniqueness in each authorization as well as link and track these authorizations so that any replay attack can be caught and denied.

Embodiments relate to preventing replay token attacks. A network processing computer can store a function table comprising functions that are used to generate authentication values (e.g., current token tracking values) that can be used to verify the use of tokens. When a current token tracking value is received during an interaction (e.g., a transaction), the network processing computer can determine if the authentication value is authentic. The network processing computer can identify the function used to create the authentication value. In addition, in some embodiments, the inputs to the function may include a prior authentication value (e.g., a control token tracking value) for that token. Embodiments make it difficult for a malicious party to use a compromised token. In order to use the token, a malicious party would need to know the function that was used to generate the authentication value (e.g., current token tracking value) as well as the prior authentication value (e.g., control token tracking value).

II. SYSTEMS

According to embodiments, a server computer (e.g., a network processing computer) can determine whether or not values received in a request message are valid. An exemplary method can include receiving, by a server computer, a request message from a token requestor computer on behalf of a user device. The request message can comprise a first current token tracking value and a first function index value. After receiving the request message, the server computer can determine a second function index value. The server computer can then compare the first function index value to the second function index value. If the first function index value and the second function index value match, the server computer can determine a function based on the first function index value and a stored function table associated with the user device. The server computer can then determine a second current token tracking value based on the function, then compare the first current token tracking value to the second current token tracking value. The server computer can generate a response message in response to the comparing.

A. System Overview

FIG. 1 shows a system 100 according to embodiments of the disclosure.

The system 100 comprises a user device 102, a resource provider computer 104, a transport computer 106, a network processing computer 108, an authorizing entity computer 110, a token requestor computer 112, and a token service computer 114. The user device 102 can be in operative communication with the token requestor computer 112. The token requestor computer 112 can be in operative communication with the resource provider computer 104 and the network processing computer 108. The network processing computer 108 can be in operative communication with the transport computer 106, the authorizing entity computer 110, and the token service computer 114. Further, the transport computer 106 can be in operative communication with the resource provider computer 104.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between the computers and devices in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user device 102 can include any suitable device operated by a user. For example, the user device 102 can include a mobile phone, a laptop computer, a desktop computer, a smartwatch, and/or any other suitable device described herein. In some embodiments, the user device 102 can comprise a digital wallet (e.g., a digital wallet application). In other embodiments, the user device 102 may communicate with a token requestor computer 112 which may store tokens on behalf of the user device 102.

In some embodiments, the user device 102 may be associated with a payment account of a user. For example, the user device 102 may include a virtual wallet or a payment application that may be associated with one or more payment accounts of the user. In some embodiments, the user device 102 may be capable of communicating with an access device (e.g., a POS terminal) using a wireless data protocol such as Wi-Fi™ or Bluetooth™. For example, the user device 102 may interact with the access device by establishing a connection with the access device using a wireless data protocol.

In some embodiments, the system 100 can further comprise the access device (not shown). The access device may be an access point to an interaction processing system that may comprise, at least, the transport computer 106, the network processing computer 108, and the authorizing entity computer 110. In some embodiments, the access device may be associated with or operated by a resource provider that operates the resource provider computer 104. The access device can include any suitable device for providing access to an external computer system to a user, for example. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. In some implementations, the access device may be configured to transmit information pertaining to one or more resources from a resource provider to the transport computer 106 or network processing computer 108. In some implementations, the access device may be a personal computer that may be used by the user to initiate a transaction with the resource provider computer 104 (e.g., an online interaction).

The token requestor computer 112 can include a computer which can request, store, manage, and provide tokens on behalf and/or on request by the user device 102. In some embodiments, The token requestor computer 112 may be configured to maintain a digital wallet associated with the user of the user device 102 as well as additional users of additional user devices. A digital wallet, for example, can store user profile information, payment information (e.g. PANs or primary account numbers, payment tokens (i.e., PAN substitutes), verification values such as CVVs, etc.), bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

In some embodiments, the digital wallet can also store current token tracking values, control token tracking values, function tables, and function index values, or any combination thereof.

The resource provider computer 104 can include any suitable computer that may be operated by an entity that can provide resource(s) (e.g., goods, services, information, access, etc.) to a user. The resource provider computer 104 can generate authorization request messages for an interaction between the resource provider of the resource provider computer 104 and the user of the user device 102. The resource provider computer can then transmit the authorization request message to the transport computer 106.

In some embodiments, the resource provider computer 104 can receive the authorization request message from an access device associated with the resource provider computer 104.

The transport computer 106 can include any suitable computer that may be operated by an entity (e.g., an acquirer). The acquirer can include a system for an entity (e.g., a bank) that has a business relationship with a particular resource provider, a wallet provider, or another entity. The transport computer 106 may issue and manage an account (e.g., a financial account) for the resource provider. The transport computer 106 may be configured to route the authorization request message for an interaction to the authorizing entity computer 110 via the network processing computer 108. The transport computer 106 may be configured to route an authorization response received via the network processing computer 108 to the resource provider computer 104.

The network processing computer 108 may be configured to provide authorization services, and clearing and settlement services for interactions. The network processing computer 108 may include data processing subsystems, wired or wireless networks, including the internet. An example of the network processing computer 108 includes VisaNet™, operated by Visa®. Processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. The network processing computer 108 may include a server computer. In some embodiments, the network processing computer 108 may forward the authorization request received from the transport computer 106 to the authorizing entity computer 110 via a communication channel. The network processing computer 108 may further forward an authorization response message received from the authorizing entity computer 110 to the transport computer 106.

The token service computer 114 may be configured to provide tokenization services. For example, the token service computer 114 may be able to provide a payment token that represents a PAN and/or other payment credentials. For example, a token request message may be sent to the token service computer 114 (e.g., from the network processing computer 108, or other suitable computer), and the token service computer 114 may then generate and/or associate a payment token with payment credentials in the token request message.

In some embodiments, the token service computer 114 may be associated with or combined with the network processing computer 108, the authorizing entity computer 110, the transport computer 106, or any other suitable entity. For example, in embodiments, tokenization services may be provided by the authorizing entity computer 110, the network processing computer 108, the transport computer 106, a third-party service provider, or any other suitable entity. Thus, the token service computer 114 may be incorporated as a part of another entity in the system 100. In some embodiments, as shown in FIG. 1, the token service computer 114 may be a separate entity.

The authorizing entity computer 110 can include any suitable computer that may be operated by an authorizing entity. The authorizing entity computer 110 may represent an account issuer and/or an issuer processor. In some embodiments, the authorizing entity computer 110 may be associated with a business entity (e.g., a bank) that may have issued an account and/or payment card (e.g., credit account, debit account, etc.) for interactions (e.g., payment transactions). The authorizing entity computer 110 and/or the network processing computer 108 may operate as authorization systems in some embodiments. For example, an interaction may be authorized by the authorizing entity computer 110 upon successful token authentication.

The authorizing entity computer 110 can be configured to determine whether or not to authorize an interaction based on the authorization request message. After determining whether or not to authorize the interaction, the authorizing entity computer 110 can generate and transmit an authorization response message to the network processing computer 106.

In some embodiments, the network processing computer 106, upon receiving the authorization response message, can forward the authorization response message to the transport computer 106. In some embodiments, the network processing computer 106 can determine which transport computer to send the authorization response message to, by evaluating a routing table and/or a data element in the authorization response message indicating the appropriate transport computer (e.g., the transport computer 106). The transport computer 106 can then forward the authorization response message to the resource provider computer 104.

After receiving the authorization response message from the network processing computer 106, the transport computer 106 can transmit the authorization response message to the resource provider computer 104. In some embodiments, after receiving the authorization response message, the resource provider computer of the resource provider computer 104 can notify the user of the status of the interaction. For example, the resource provider computer can notify the user via the access device or the user device 102 of whether or not the interaction (e.g., a transaction) is authorized.

B. Network Processing Computer

Figure 2:
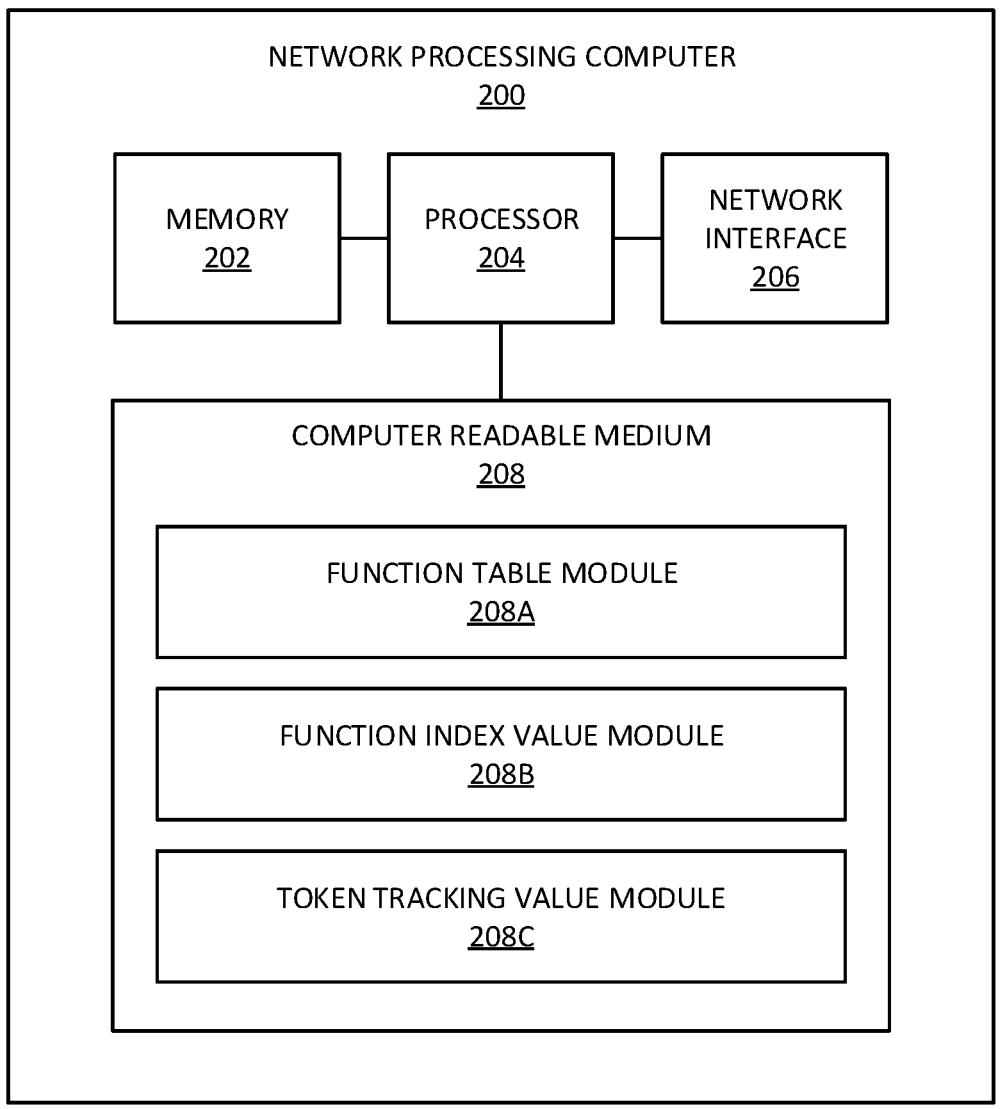
FIG. 2 shows a block diagram of components of a server computer according to embodiments.

FIG. 2 shows a block diagram of a network processing computer 200 according to embodiments. The exemplary network processing computer 200 may comprise a processor 204. The processor 204 may be coupled to a memory 202, a network interface 206, input elements 210, output elements 212, and a computer readable medium 208. The computer readable medium 208 can comprise a function table module 208A, a function index value module 208B, and a token tracking value module 208C.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store function pools, routing tables, etc. In some embodiments, the memory 202 may further store function tables, current token tracking values (e.g., a first current token tracking value, a second current token tracking value, etc.), control token tracking values (e.g., a first control token tracking value, a second control token tracking value, etc.), function index values, etc.

The computer readable medium 208 may comprise code, executable by the processor 204, for performing a method comprising: receiving, by a server computer, a request message from a user device, the request message comprising a first current token tracking value and a first function index value; determining, by the server computer, a second function index value; comparing, by the server computer, the first function index value to the second function index value; if the first function index value and the second function index value match, determining, by the server computer, a function based on the first function index value and a stored function table associated with the user device; determining, by the server computer, a second current token tracking value based on the function; comparing, by the server computer, the first current token tracking value to the second current token tracking value; and generating, by the server computer, a response message in response to the comparing.

The function table module 208A may comprise code or software, executable by the processor 204, for creating function tables. The function table module 208A, in conjunction with the processor 204, can generate a function table, to be associated with a token, based on a function pool. For example, the function table module 208A, in conjunction with the processor 204, can generate a function table comprising 10 functions by randomly selecting 10 functions of a function pool comprising 1000 functions. The function table module 208A, in conjunction with the processor 204, can utilize any suitable random or pseudorandom function to select a predetermined number of functions of the function pool to include into the function table.

For example, the function table module 208A, in conjunction with the processor 204, can randomly generate a predetermined number of function index values. The function table module 208A, in conjunction with the processor 204, can generate the function index values of [124, 480, 7, 931, 734, 590, 217, 401, 646, 833]. The function table module 208A, in conjunction with the processor 204, can retrieve the functions of the function pool associated with the function index values of [124, 480, 7, 931, 734, 590, 217, 401, 646, 833]. The function table module 208A, in conjunction with the processor 204, can then create a function table comprising the retrieved functions. In some embodiments, the function table module 208A, in conjunction with the processor 204, can re-index the functions of the function table (e.g., values from 0-9).

The function index value module 208B may comprise code or software, executable by the processor 204, for determining function index values. The function index value module 208B, in conjunction with the processor 204, can determine a function index value corresponding to a received request message from a user device. The request message can, for example, comprise a first current token tracking value and a first function index value. The function index value module 208B, in conjunction with the processor 204, can determine a second function index value.

For example, the function index value module 208B, in conjunction with the processor 204, can determine the function index value based on a current time. The function index value module 208B, in conjunction with the processor 204, can determine a current epoch time (et). The function index value module 208B, in conjunction with the processor 204, can then determine a particular digit of the current time. For example, the current time may be 1555396199. The function index value module 208B, in conjunction with the processor 204, can determine the hundreds digit, or other suitable digit (e.g., ones digits, tens digits, etc.), of the current time to be the function index value.

The token tracking value module 208C may comprise code or software, executable by the processor 204, for determining token tracking values (e.g., current token tracking values). The token tracking value module 208C, in conjunction with the processor 204, can determine a current token tracking value based on a control token tracking value (e.g., a prior token tracking value associated with the same token). The token tracking value module 208C, in conjunction with the processor 204, can determine a function of the function table to which the function index value (e.g., determined by the function index value module 208B) is associated. After determining the function, the token tracking value module 208C, in conjunction with the processor 204, can input the control token tracking value (e.g., retrieved from a memory or token vault) into the determined function. The output of the function can be a current token tracking value.

The network interface 206 may include an interface that can allow the network processing computer 200 to communicate with external computers. The network interface 206 may enable the network processing computer 200 to communicate data to and from another device (e.g., the transport computer, the authorizing entity computer, the token service computer, the token requestor computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

III. METHODS

Figure 3:
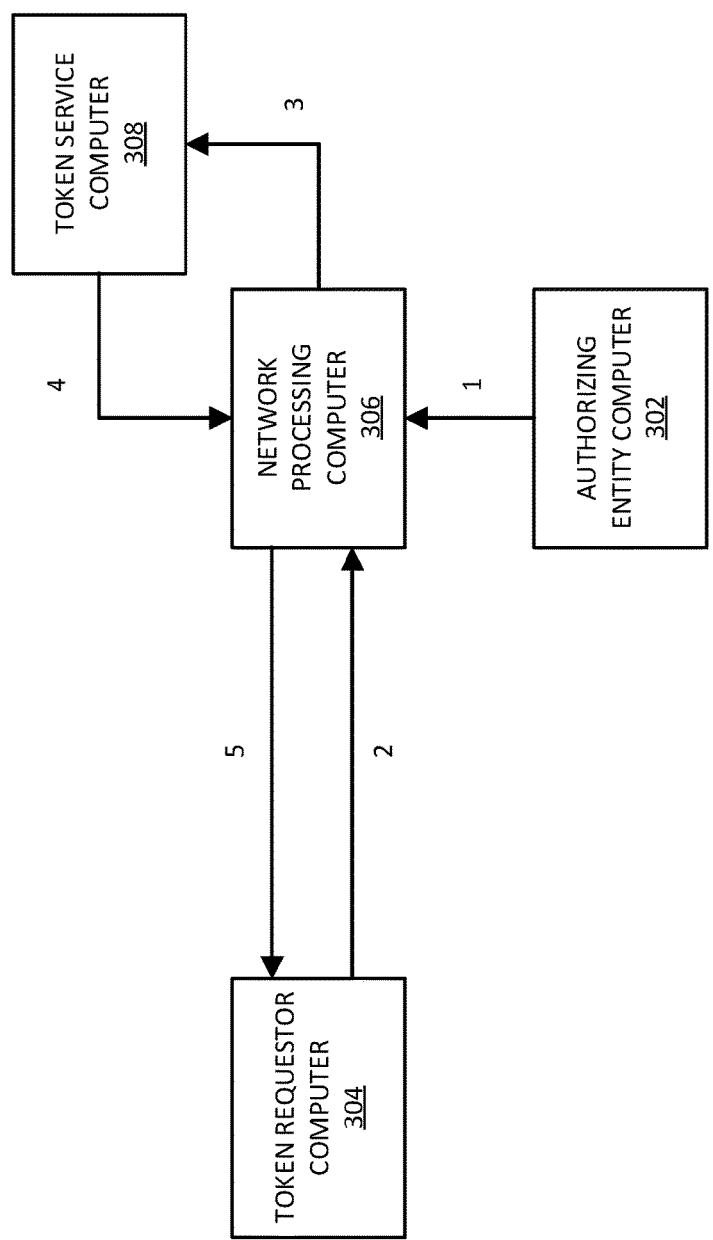
FIG. 3 shows flow diagram illustrating a provisioning process according to embodiments.
Figure 4:
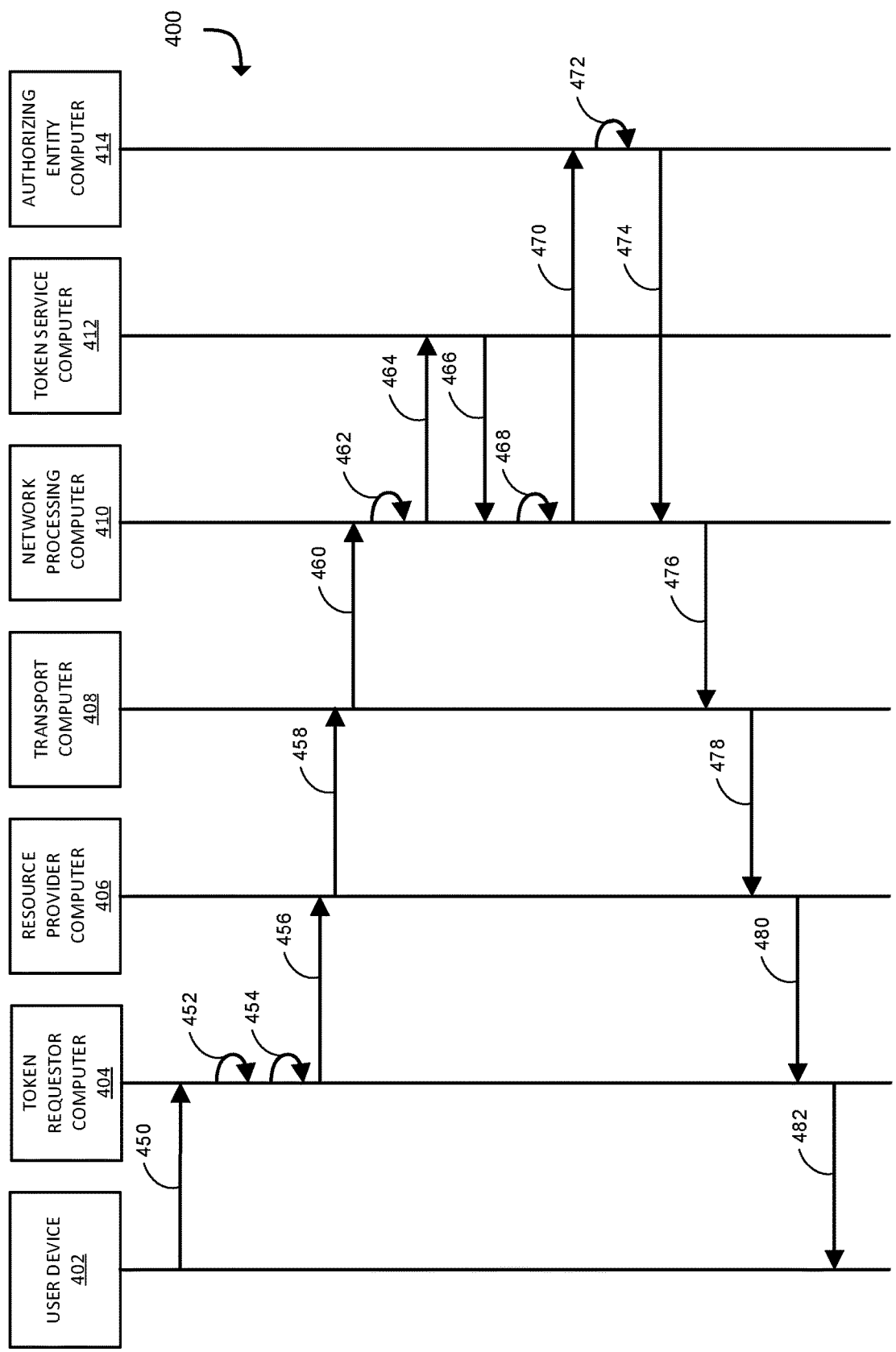
FIG. 4 shows flow diagram illustrating an authorization process according to embodiments.
Figure 5:
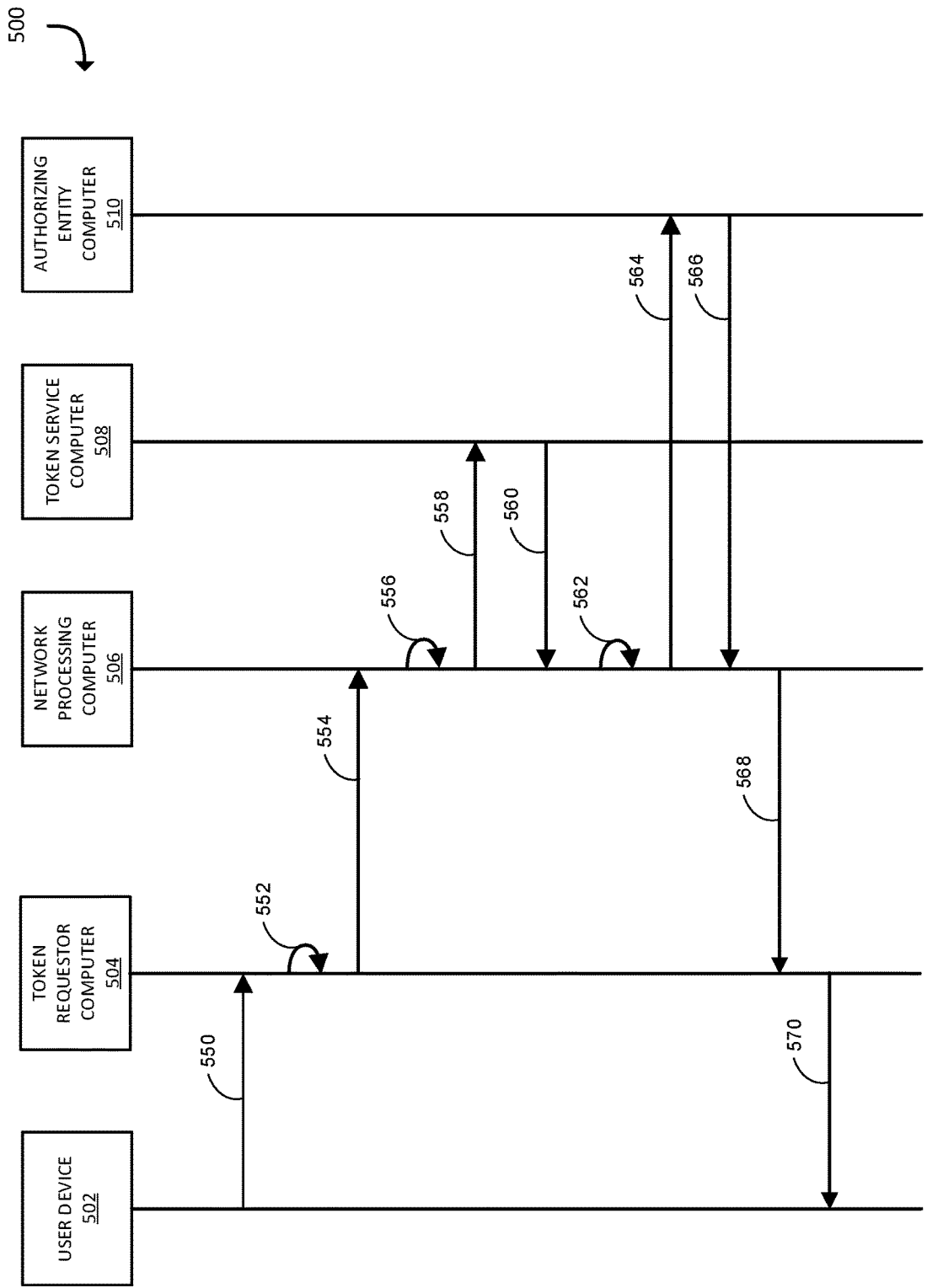
FIG. 5 shows flow diagram illustrating a secure location access process according to embodiments.

Embodiments can use the systems and apparatuses described herein to at least determine whether or not a received token is valid. FIGS. 3-5 describe some examples of such methods. In some embodiments, the network processing computer 306, 410, and 506 of FIGS. 3, 4, and 5, respectively, may include the network processing computer 108 or the network processing computer 200 of FIGS. 1 and 2, respectively.

A. Overview of Token Tracking

Embodiments provide for systems and methods where a current token tracking value is generated using, for example, a time indexed function and a previous token tracking value (e.g., a control token tracking value).

A function of a function table can be used to determine a current token tracking value. Which function of the function table that is selected can be based on a current time. For example, at time t a function index value fi can be:

$$fi = f(t)$$

The function index value fi can index to 0-n number of functions, ranging from f[0](x) to f[n](x), where x can be the control token tracking value. Further, a current token tracking value can be referred to as xc. The control token tracking value can be referred to as xp. The current token tracking value xc can be determined based on the control token tracking value xp.

$$xc = f[f(t)](xp)$$

A next (e.g., subsequent) control token tracking value xn can be the next value at time t1. The next control token tracking value xn can be determined based on the current token tracking value xc (e.g., which may also, at time t1, be referred to as a control token tracking value).

$$xn = f[f(t1)](xc)$$

The tracking mechanism can be achieved by saving and delivering a current token tracking value tATV as a subsequent control token tracking value ctATV. For each interaction (e.g., payment authorization) a token requestor computer, or a user device, can create a current token tracking value tATV from the control token tracking value ctATV and can then store the current token tracking value tATV as a newly formed control token tracking value ctATV. This process can allow devices, in embodiments, to create a chain of tATV|ctATV pairs that creates the tracking mechanism.

Similarly, the network processing computer can validate the current token tracking value tATV by using the control token tracking value ctATV from a token vault. Upon successful validation, the network processing computer can store (e.g., save) the current token tracking value tATV as a control token tracking value ctATV in the token vault, or in some embodiments, the token service computer.

B. Token Provisioning Cycle

FIG. 3 shows flow diagram illustrating a provisioning process according to embodiments. The method illustrated in FIG. 3 will be described in the context of a token requestor computer requesting a token for a user device operated by a user. It is understood, however, that the invention can be applied to other circumstances (e.g., the user device can request the token, a resource provider computer can request the token, etc.). Further, the interaction can be any suitable interaction between the user and a resource provider of the resource provider computer.

At step 1, an authorizing entity computer 302 can generate a function pool. A function pool can include a plurality of functions. For example, a function pool can include 100 functions. The function pool can include, for example, a pool of functions $F(x_0)$ to $F(x_n)$. The function pool can include a function pool size (e.g., a number of functions included in the function pool). The function pool size can be any suitable number. For example, in some embodiments, the function pool size can be equal to or greater than 100 functions. In some embodiments, a larger function pool size can result in higher levels of security.

TABLE 1

| Example Function Pool | |
| --- | --- |
| Function Pool Index | Function |
| 0 | f(x0) |
| 1 | f(x1) |
| ... | ... |
| 100 | f(x100) |

Table 1, above, illustrates an example function pool. Each function can be associated with a function pool index. Further, in some embodiments, each function of the function pool can be a different function. The authorizing entity computer 302 can setup the equations (e.g., single order, polynomial, etc.) of individual functions in the function pool.

The function pool can be represented in any suitable manner. For example, in some embodiments, the function pool can be represented through a mathematical modelled JSON. The JSON can have a root as the function pool followed by an array of indexes and each index containing certain f(x) equation. Table 2, below, illustrates a sample object model of a function pool.

TABLE 2

| Example JSON Object Model | | | |
| --- | --- | --- | --- |
| object | | {1} | |
| function_table | | | {1} |
| indexes | | [10] | |
| 0 | | {1} | |
| operations | | | [4] |
| 0 | | | {3} |
| 1 | | | {3} |
| 2 | | | {3} |
| 3 | | | {3} |

Further, a sample JSON code, for representational purpose only, shows index [0] details:

```
{
    "function_table": {
        "indexes": [
            {
                "operations": [
                    {
                        "type": "multiply",
                        "params": [
                            "ctatv",
                            "constan1"
                        ],
                        "next_operation": "add"
                    },
                    {
                        "type": "square",
                        "param": "ctatv",
                        "next_operation": "add"
                    },
                    {
                        "type": "add",
                        "params": [
                            "ctatv",
                            "constant2"
                        ],
                        "next_operation": "truncate"
                    },
                    {
                        "type": "truncate",
                        "digits": "4",
                        "next_operation": "final"
                    }
                ]
            }
        ]
    }
}
```

After generating the function pool, the authorizing entity computer 302 can provide the function pool to the network processing computer 306. In some embodiments, the authorizing entity computer 302 can utilize a messaging service or file transfer protocol (FTP) to upload the function pool to the network processing computer 306. In other embodiments, the authorizing entity computer 302 can encrypt the function pool with for example a network processing computer public key, or other suitable cryptographic key (e.g., a shared symmetric key, etc.). The authorizing entity computer 302 can then provide the encrypted function pool to the network processing computer 306. The encrypted function pool can be encrypted such that the network processing computer 306 can be capable of decrypting the encrypted function pool to obtain the function pool.

In some embodiments, the network processing computer 306 can generate the function pool locally in a manner similar to how the authorizing entity computer 302 generates the function pool.

At step 2, at any suitable time after the network processing computer 306 receives the function pool from the authorizing entity computer 302, a token requestor computer 304 can transmit a token request message to the network processing computer 306. For example, the token requestor computer 304 may be requesting a token for a user of a user device. The token request message can comprise any suitable data relevant to the user. For example, in some embodiments, the token request message can comprise a user identifier and/or credentials associated with the user.

At step 3, after receiving the token request message from the token requestor computer 304, the network processing computer 306 can create a function table that will be associated with the user and/or user device that is requesting the token. The function table can be dynamically created for a token by the network processing computer 306 during provisioning. The network processing computer 306 can use a random function to create a function table from the function pool. For example, the random function can specify which functions of the function pool to include into the function table.

The network processing computer 306 can utilize the random function to, for example, fetch 10 random functions from the function pool and create a function table. However, it is understood that any suitable number of functions of the function pool can be included into the function table. For example, the function pool may include 1000 functions while the function table may include 100 functions selected therefrom. Further, the network processing computer 306 can generate function index values for each selected function.

In some embodiments, the function table can comprise the function index values and the functions associated therewith. In other embodiments, the function table can comprise the function index values and the function pool index values. In this case, the network processing computer 306, when later determining a particular function to utilize, can look up the function pool index in the function table based on a known function index. Then, the network processing computer 306 can look up the function in the function pool based on the known function pool index.

Table 3, below, illustrates an example function table. In this example, three columns of function pool index, function index, and function are included. However, it is understood, that the function table can comprise two columns of the function pool index and the function index or two columns of function index and function, in some embodiments.

TABLE 3

Example Function Table

| Function Pool Index | Function Index | Function |
|---|---|---|
| 0 | 0 | $F(x) = \text{truncate}_4((x * 2)^2)$ |
| 13 | 1 | $F(x) = \text{truncate}((x * 8)^2 + 123)$ |
| 71 | 2 | $F(x) = \text{truncate}_4((x * 2)^{1/2})$ |
| 31 | 3 | $F(x) = \text{truncate}_4(\text{SIN}(x) + (x * 2)^2)$ |
| 54 | 4 | $F(x) = \text{truncate}(x + x + 456)$ |
| ... | . | $F(x) = \text{truncate}((x * 0.5)^2 + 1234)$ |
| 3 | 9 | $F(x) = \text{truncate}_4(x^2 + 2x + 789)$ |

The network processing computer 306 can further generate a first time use control token tracking value. The network processing computer 306 can generate the control token tracking value based on a determined function index value (e.g., a particular digit of a current time) and a randomly generated number to input into the function indicated by the function index value. In some embodiments, the first time use control token tracking value may be a randomly generated number. The first time use control token tracking value can be, for example, a four-digit number.

Further during step 3, the network processing computer 306 can provide the function table as well as the first time use control token tracking value to the token service computer 308. The network processing computer 306 can request for the token service computer 308 to generate a token associated with the function table and the first time use control token tracking value, and thus also associated with the user.

After receiving the function table and the first time use control token tracking value, the token service computer 308 can generate a token which can be associated with the received function table and first time use control token tracking value. The token service computer 308 can store the function table and the first time use control token tracking value in a token vault which may be associated with the token. For example, the first time use control token tracking value can be saved in the token vault such that it may be used in a next authorization. The token service computer 308 can generate the token in any suitable manner as known to one of skill in the art.

At step 4, the token service computer 308 can provide the token to the network processing computer 306 in response to receiving the function table and the first time use control token tracking value.

At step 5, after receiving the token from the token service computer 308, the network processing computer 306 can encrypt the function table such that the encrypted function table may be securely provided to the token requestor computer 304. The function table JSON (e.g., as illustrated in Table 2) for the respective user can to be encrypted using a token requestor public key and passed to the token requestor computer 304 as a part of a token response message. The network processing computer 306 can provide the first time use control token tracking value, the encrypted function table, and the token to the token requestor computer 304.

After receiving, the first time use control token tracking value, the encrypted function table, and the token, he token requestor computer 304 can decrypt the encrypted function table. For example, the token requestor can decrypt the encrypted function table using a token requestor private key. The token requestor computer 304 can store the first time use control token tracking value, the decrypted function table, and the token, in a secure manner. In some embodiments, the token requestor computer 304 can store the encrypted function table and at a later point in time decrypt the encrypted function table when needed. At a point later in time, during an interaction, the token requestor computer 304 can retrieve and utilize the control token tracking value, the decrypted function table, and the token, as described in further detail herein.

C. Authorization Process

FIG. 4 shows flow diagram illustrating an authorization process according to embodiments. The method illustrated in FIG. 4 will be described in the context of a user performing an interaction with a resource provider to obtain a resource. The user can utilize a user device to request a token requestor computer to provide a token associated with the user to a resource provider computer operated by the resource provider. It is understood, however, that embodiments can be applied to other circumstances (e.g., the user device storing the token and providing the token to the resource provider computer, the resource provider computer requesting the token from the token requestor computer, etc.).

At step 450, the user device 402 can transmit a request to the token requestor computer 404 for the token requestor computer 404 to provide a token to the resource provider computer 406 in response to the user device 402 initiating an interaction with the resource provider computer 406. In some embodiments, the request can further comprise a user identifier. In other embodiments, the request can include a resource provider computer identifier or any other suitable identifier that identifies to which party the token requestor computer should communicate the token.

At step 452, after receiving the request from the user device 402 to provide the token (e.g., associated with the user device 402) to the resource provider computer 406, the token requestor computer 404 can determine a first function index value. The token requestor computer 404 can determine the first function index value in any suitable manner. For example, in some embodiments, the token requestor computer 404 can determine the first function index value based on a current time.

As an illustrative example, the token requestor computer 404 can determine a current epoch time (et). For example, the current epoch time can be equal to a value of 1555396199. The token requestor computer 404 can select a predetermined digit of the current epoch time. For example, the token requestor computer 404 can select the hundredths digit (e.g., the 3rd digit from the left). In this case, the hundredths digit is equal to a value of 1. The token requestor computer 404 can utilize the hundredths digit of 1 as the first function index value. By using the hundredths place as the function index value, the index can be ensured to change every 100th second. It is understood, however, that the predetermined digit can be any suitable digit of the current epoch time. For example, the predetermined digit can include the tenths digit, the thousands digit, or any other suitable digit or value determined therefrom.

At step 454, after determining the first function index value, the token requestor computer 404 can determine a first current token tracking value. Further, the token requestor computer 404 can retrieve a first control token tracking value from a secure memory. The first control token tracking value can be a control token tracking value received during provisioning, for example, at step 5 of FIG. 3. The token requestor computer 404 can generate the first current token tracking value based on the control token tracking value.

For example, the token requestor computer 404 can retrieve the function of the function table which corresponds to the first function index value. From the above determined first function index value equal to a value of 1, the token requestor computer 404 can determine to use the second function of the function table (e.g., since it corresponds to the index of 1, where the first function corresponds to the index of 0). The token requestor computer 404 can fetch the function f[fi](x) for the first function index value fi=1. The token requestor computer 404 can parse the function table (e.g., a JSON function table model) in any suitable manner to determine the function. The token requestor computer can then input the first control token tracking value into the second function of the function table. The output of the second function can be the first current token tracking value. In some embodiments, the token requestor computer 404 may not use transaction level payment data to generate a token tracking value (e.g., a current token tracking value or a control token tracking value). For example, the token requestor computer 404 can compute the following equation, where f is the function, fi is the function index value, ctATV is the control token tracking value, and tATV is the current token tracking value.

$$tATV = f[fi](ctATV)$$

Further, the token requestor computer 404 can store the created first current token tracking value as a second control token tracking value. As an illustration, the token requestor computer 404 can set:

$$ctATV = tATV$$

As an illustrative example, the token requestor computer 404 can input the first current token tracking value into the function. As an example, the first function index value can have a value equal to 1. The token requestor computer 404 can determine the function associated with the index of 1. For example, the function can be $tATV=truncate_4(ctATV*2)$ and the first control token tracking value can be equal to a value of 8967. The token requestor computer 404 can determine the current token tracking value (tATV) of $7934=truncate_4(8967*2)$.

By saving the first current token tracking value (tATV) as the second control token tracking value (ctATV), the token requestor computer 404 can create a tracking mechanism between next interactions and associated authorization request messages.

At step 456, the token requestor computer 404, can provide the token, the first function index value, the first current token tracking value, and the first control token tracking value to the resource provider computer 406. In some embodiments, the token requestor computer 404 can further provide a user identifier to the resource provider computer 406.

At step 458, after receiving the token, the first function index value, the first current token tracking value, and the first control token tracking value, the resource provider computer 406 can generate an authorization request message. The authorization request message can comprise the token, the first function index value, and the first current token tracking value, and/or any other suitable data related to the interaction between the user and the resource provider. The resource provider computer 406 can then provide the authorization request message to the transport computer 408.

For example, in some embodiments, the authorization request message can comprise a data item that includes a concatenated version of the first function index value, the first current token tracking value, and the first control token tracking value. For example, the data item can be (tATV|c-tATV|fi).

The three of the above data elements of the data item can be passed as a composite 9 bytes of numeric data block. The data can be positional identified, for example, the first four bytes can be the first current token tracking value (tATV), the next four bytes can be the first control token tracking value (ctATV), and the last byte can be the first function index value (fi). As a numerical example, the first current token tracking value, the first control token tracking value, and the first function index value can be represented as 793489673.

At step 460, after receiving the authorization request message from the resource provider computer 406, the transport computer 408 can forward the authorization request message to the network processing computer 410.

At step 462, after receiving the authorization request message comprising at least the first current token tracking value and the first function index value from the transport computer 408, the network processing computer 410 can parse the data of the authorization request message. For example, the authorization request message can comprise the first current token tracking value, the first control token tracking value, and the first function index value (e.g., tATV|ctATV|fi). The network processing computer 410 can parse the data to obtain the first current token tracking value, the first control token tracking value, and the first function index value.

The network processing computer 410 can determine a second function index value. The network processing computer 410 can determine the second function index value in any suitable manner, as described in detail herein. For example, the network processing computer 410 can determine the second function index value in the same manner to how the token requestor computer 404 determined the first function index value, and will not be repeated here. For example, the network processing computer 410 can determine the second function index value to be equal to a value of 1.

The network processing computer 410 can compare the first function index value to the second function index value. For example, the network processing computer 410 can determine whether or not the first function index value and the second function index value match. In this case, the first function index value is equal to a value of 1.

If the first function index value and the second function index value match, then the network processing computer 410 can safely determine that the received first function index value is valid.

If the first function index value and the second function index value do not match, then the network processing computer 410 can perform additional processing to determine whether or not the first function index value is being received as a part of a replay attack. For example, the network processing computer 410 can determine whether or not the first function index value (e.g., received) is equal to 9 and the second function index value (e.g., computed by the network processing computer 410) is equal to 0. In this case, the values may have looped (via modular arithmetic) from the value of 9 back to the value of 0. For example, enough time may have passed between 1) when the token requestor computer 404 determined the first function index value and 2) when the network processing computer 410 determined the second function index value such that the epoch time has increased enough for the value to change. In such a case, the network processing computer 410 can determine that the time is at the boundary and can then change the second function index value to be equal to the first function index value and may then continue with step 464.

If the absolute difference between the first function index value and the second function index value is greater than a value of 1 (e.g., more than 100 seconds have passed), then the network processing computer 410 can determine that the received first function index value is possibly a part of a replay attack since the received function index value differs, in time, by more than the threshold amount of 100 seconds (as determined by the predetermined digit of the epoch time, above). The network processing computer 410 can generate a new control token tracking value to reset the chain of control token tracking values and current token tracking values. In some embodiments, the network processing computer 410 can provision the new control token tracking value to the token requestor computer 404. In other embodiments, the network processing computer 410 can also generate a fraud alert and provide the fraud alert to any suitable entity and/or computer of, for example, FIG. 1. Further, the network processing computer 410 can decline the current interaction. For example, the network processing computer 410 can generate an authorization response message indicating that the interaction is declined. The network processing computer 410 can then provide the authorization response message to the resource provider computer 406 via the transport computer 408 and the transport computer 408.

At step 464, in some embodiments, if the first function index value and the second function index value match, the network processing computer 410 can retrieve the function table from the token service computer 412. For example, the token service computer 412 can store the function table associated with the user and/or the user device 402 during provisioning of the token (e.g., as described in FIG. 3). In some embodiments, the network processing computer 410 can provide the token to the token service computer 412.

At step 466, after receiving a request for the function table, the token service computer 412 can provide the function table to the network processing computer 410. For example, the token service computer 412 can determine which function table to provide to the network processing computer 410 based on which function table is associated with the received token. In some embodiments, the token service computer 412 can further determine credentials (e.g., a PAN) associated with the token. The token service computer 412 can provide the credentials (e.g., user credentials) to the network processing computer 410. For example, the network processing computer 410 can later replace the token with the user credentials in the authorization request message when provided to the authorizing entity computer 414, described in further detail herein.

At step 468, after retrieving the function table associated with the token, the network processing computer 410 can determine a function based on the first function index value and the stored function table. For example, the first function index value can indicate to the network processing computer 410 which function of the function table to utilize to determine a second current token tracking value (e.g., a second token tracking value). The network processing computer 410 can also retrieve a stored control token tracking value (e.g., a second control token tracking value). The second control token tracking value can be input into the function. As an example, the first function index value has a value equal to 1. The network processing computer 410 can determine the function associated with the index of 1. For example, the function can be $tATV = truncate_4 (ctATV*2)$.

After determining which function of the function table to utilize, the network processing computer 410 can determine a second current token tracking value based on the function. For example, the network processing computer 410 can input the second control token tracking value into the function of $tATV = truncate_4(ctATV*2)$. For example, the second control token tracking value can be equal to a value of 8967. The network processing computer 410 can determine the second current token tracking value (tATV) of $7934 = truncate_4 (8967*2)$.

The network processing computer 410 can compare the first current token tracking value to the second current token tracking value. If the first current token tracking value and the second current token tracking value are not equal, then the network processing computer 410 can determine that the received first current token tracking value is a part of a replay attack or other fraudulent attempt. In such a case, the network processing computer 410 can then generate a new control token tracking value that may be provisioned to the token requestor computer 404. The network processing computer 410 can further decline authorization of the current interaction. For example, the network processing computer 410 can generate an authorization response message which indicates that the interaction is not authorized, as described herein.

If the first current token tracking value and the second current token tracking value are equal then the network processing computer 410 can determine that the received current token tracking values pass validation. However, in some embodiments, the network processing computer 410 can perform additional verification techniques to further determine whether or not the received first current token tracking value is a part of a replay attack or other fraudulent attempt.

For example, the network processing computer 410 can determine whether or not the first current token tracking value (e.g., received) is equal to the second control token tracking value (e.g., retrieved from the token vault). If the first current token tracking value matches the second control token tracking value, then the network processing computer 410 can determine that the received first current token tracking value is a part of a replay attack. This situation would occur if a malicious party were to steal a token and first current token tracking value, and subsequently provide the token and the first current token tracking value in an authorization request message. The network processing computer 410 can determine that this is a replay attack since the first current token tracking value, stolen by the malicious party, was not updated using the function table (as described above). This is why if the received current token tracking value is the same as the stored second current token tracking value, a malicious party is attempting a replay attack.

Further, in some embodiments, the network processing computer 410 can compare the first control token tracking value to the second control token tracking value. If the first control token tracking value and the second control token tracking value do not match, the network processing computer 410 can determine that the first current token tracking value is out of sequence. The network processing computer 410 can then transmit a current token tracking value request message to the token requestor computer 404. The current token tracking value request message can, for example, include a request for a new current token tracking value.

If the first control token tracking value and the second control token tracking value match, the network processing computer 410 can store the first current token tracking value as a subsequent stored control token tracking value in the token service computer 412. In some embodiments, the subsequent stored control token tracking value can be utilized during a subsequent request message.

If the first control token tracking value and the second control token tracking value match, the network processing computer 410 can generate a response message in response to the comparing. The response message can include, for example, a modified authorization request message which may be forwarded to the authorizing entity computer 414 in step 470, below. In some embodiments, the network processing computer 410 can modify the authorization request message to include, at least, user credentials (e.g., a PAN) which may be received at step 466 from the token service computer 412.

At step 470, after determining that the token originates from a valid party (e.g., the user of the user device 402), the network processing computer 410 can transmit the authorization request message to the authorizing entity computer 414.

At step 472, after receiving the authorization request message, the authorizing entity computer 414 can determine whether or not to authorize the interaction between the user of the user device 402 and the resource provider of the resource provider computer 406. The authorizing entity computer 414 can generate an authorization response message comprising the user credentials and an indication of whether or not the interaction is authorized.

At step 474, after determining whether or not to authorize the interaction, the authorizing entity computer 414, can transmit the authorization response message to the network processing computer 410.

At step 476, after receiving the authorization response message from the authorizing entity computer 414, the network processing computer 410 can transmit the authorization response message to the transport computer 408. In some embodiments, the network processing computer 410 may request the token associated with the user credentials from the token service computer 412. Upon receiving the user credentials, the network processing computer 410 can modify the authorization response message to comprise, at least, the token and the indication of whether or not the interaction is authorized.

At step 478, after receiving the authorization response message from the network processing computer 410, the transport computer 408 can transmit the authorization response message to the resource provider computer 406.

At step 480, after receiving the authorization response message from the transport computer 408, the resource provider computer 406 can transmit the authorization response message to the token requestor computer 404. In some embodiments, the resource provider computer 406 can provide the authorization response message directly to the user device 402.

At step 482, after receiving the authorization response message from the resource provider computer 406, the token requestor computer 404 can transmit the authorization response message to the user device 402. If the authorization response message comprises an indication that the interaction is authorized, then the user of the user device 402 and the resource provider of the resource provider computer 406 can proceed with the interaction.

D. Verification Example

Steps 462-468 of FIG. 4 illustrate verification of current token tracking values by a network processing computer 410. The following pseudocode illustrates an example process that can be performed with the current token tracking values by the network processing computer 410. Table 4, below, includes a legend of variables corresponding to the pseudocode.

TABLE 4

Pseudocode Legend

| Variable | Meaning |
|---|---|
| (m) | Received message data |
| (v) | Data from token vault |
| (c) | Computed data |
| fi | Function index value |
| tATV | Current token tracking value |
| ctATV | Control token tracking value |

After receiving the request message, described herein, the network processing computer can extract the hundredth place digit from a current epoch time, set the fi(c), and evaluate time boundary conditions:

```
if (fi(c) != fi(m))
{
    if (fi(c) == 0 and fi(m) == 9)
    {
        // at the boundary, use the fi(m)
        fi(c) = fi(m)
    }
    else
    if (absolute_difference(fi(c) - fi(m)) > 1)
    {
        // suspected fraud and/or replay attack
        // generate new ctATV
        generate_ctATV( )
        // generate a Token Alert with new ctATV
            generate_token_tATV_alert(ctATV, FRAUD)
        decline_authorization(FRAUD)
            exit( )
    }
    else // fi between 0 to 8
    {
        // assuming that the tATV was generated within last 100
        seconds
        // Use fi(m)
        fi(c) = fi(m)
    }
}
```

The network processing computer can utilize the computed function index fi(c) to fetch a JSON function model (e.g., a function from the function table). The network processing computer can then parse the function model and use the ctATV(v) to compute the tATV(c).

tATV(c)=f(ctATV(v))

The network processing computer can compare the computed tATV(c) with the message tATV(m).

```
if (tATV(m) != tATV(c))
{
    // suspected fraud / replay
    // generate new ctATV
    generate_ctATV( )
    // generate Token Alert with new ctATV
        generate_token_tATV_alert(ctATV, FRAUD)
    // Decline authorization
    exit( )
}
else // tATV validation pass
{
    // if tATVs are valid, detect replay first
    // Compare the control tATV from Vault with tATV message
    if (ctATV(v) == tATV(m))
    {
        // Replay attack!
        // generate new ctATV
        generate_ctATV( )
            generate_token_tATV_alert(ctATV,
            REPLAY_ATTACK)
        // Decline authorization
            exit( )
    }
    // Compare the control tATVs
    if (ctATV(m) == ctATV(v))
    {
        // Valid control tATVs
        // Save the tATV(m) in a token vault and/or the
        token service computer
            // to create the interaction chaining
            ctATV(v) = tATV(m)
    }
    else
    {
        // Determine that there is an out of sequence tATV
        // Generate Token Requestor tATV Alert
        // But don't decline the interaction
        generate_ctATV( )
            generate_token_tATV_alert(ctATV,
            OUT_OF_SEQUENCE)
            exit( )
    }
}
generate_ctATV( ): This method can generate new ctATV
generate_token_tATV_alert( ):
```

The method of generate_token_tATV_alert( ) can allow the network processing computer to create and transmit an alert message to the token requestor computer. In some embodiments, the alert can pass the new control token tracking value ctATV. The alert may also further comprise a reason for the alert. The reason for the alert can be, for example, "FRAUD," "REPLAY_ATTACK," "OUT_OF_SEQUENCE," etc.

E. Secure Location Access

FIG. 5 shows flow diagram illustrating a secure location access process according to embodiments. The method illustrated in FIG. 5 will be described in the context of a user requesting access to a secure location (e.g., a locked building). It is understood, however, that the invention can be applied to other circumstances (e.g., the user requesting access to a secure webpage, etc.).

At step 550, the user device 502 can transmit a request to access a secure location the token requestor computer 504. The request can include a request for the token requestor computer 504 to provide a token to the network processing computer 504 on behalf of the user device 502. For example, the interaction can include the user of the user device 502 requesting access to a secure building.

At step 552, after receiving the request from the user device 502, the token requestor computer 504 can determine a first function index value. The token requestor computer 504 can determine the first function index value in any suitable manner described herein. For example, in some embodiments, the token requestor computer 504 can determine the first function index value based on a current time (e.g., the hundredths digit of the current epoch time). After determining the first function index value, the token requestor computer 504 can determine a first current token tracking value. Further, the token requestor computer 504 can retrieve a first control token tracking value from a secure memory. The first control token tracking value can be a control token tracking value received during provisioning, for example, at step 5 of FIG. 3. The token requestor computer 504 can generate the first current token tracking value based on the control token tracking value.

At step 554, the token requestor computer 504 can generate and transmit an authorization request message comprising the token, the first function index value, the first current token tracking value, and the first control token tracking value to the network processing computer 506.

At step 556, after receiving the authorization request message, the network processing computer 506 can determine whether the received current token tracking values are valid. For example, the network processing computer 506 can perform step 462 of FIG. 4. Steps 558-562 may be similar to steps 464-468 of FIG. 4 and will not be repeated here.

At step 564, the network processing computer 506 can transmit the authorization request message to the authorizing entity computer 510. The authorization request message can include user credentials and/or the token. In some embodiments, the authorization request message may further comprise a building identifier capable of identifying a building to which the user is requesting access.

At step 566, after receiving the authorization request message, the authorizing entity computer 510 can determine whether or not to authorize the user to access the secure location associated with the building identifier. For example, the authorizing entity computer 510 can verify that the user associated with the user credentials and/or token is included in a stored list of users that are associated with the building identifier. After determining whether or not to authorize the user to access the secure location, the authorizing entity computer 510 can generate and transmit an authorization response message to the network processing computer. The authorization response message comprising any suitable data, as described in detail herein.

At step 568, after receiving the authorization response message, the network processing computer 506 can transmit the authorization response message to the token requestor computer 504. In some embodiments, if the authorization response message comprises the user credentials, the network processing computer 506, in conjunction with the token service computer 508, can replace the user credentials with the token associated with the user.

At step 570, after receiving the authorization response message, the token requestor computer 504 can provide the authorization response message, or the indication of whether or not the interaction is authorized stored therein, to the user device 502. Further, the user of the user device 502 may be granted or denied access to the secure location based on the indication of whether or not the interaction is authorized.

Embodiments of the disclosure have a number of advantages. For example, embodiments make it difficult for a malicious party to use a compromised token (e.g., as in a replay attack). In order to use the compromised token, a malicious party would need to know the function that was used to generate the associated current token tracking value as well as the prior token tracking value (e.g., control token tracking value).

Embodiments provide for a number of additional advantages. For example, the process does not require the use of resource heavy encryption processes or cryptographic keys to verify the data presented during the interaction, thus reducing both processing power requirements and total interaction time allowing the user to more quickly receive an indication of whether or not the interaction is authorized.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a server computer, a request message from a token requestor computer on behalf of a user device, the request message comprising a first control token tracking value, a first current token tracking value and a first function index value;
   determining, by the server computer, a second function index value;
   comparing, by the server computer, the first function index value to the second function index value;
   if the first function index value and the second function index value match, retrieving, by the server computer, a second control token tracking value from storage in a token service computer, and determining, by the server computer, a function based on the first function index value and a stored function table associated with the user device;
   determining, by the server computer, a second current token tracking value based on the function;
   comparing, by the server computer, the first current token tracking value to the second current token tracking value; and
   generating, by the server computer, a response message in response to the comparing, and wherein the method further comprises:
   in response to determining that the first current token tracking value matches the second current token tracking value, comparing, by the server computer, the first control token tracking value to the second control token tracking value;
   comparing, by the server computer, the first current token tracking value and the second control token tracking value; and
   if the first current token tracking value and the second control token tracking value match, then determining, by the server computer, that the user device is a malicious user device;
   generating, by the server computer, a replacement control token tracking value;
   storing, by the server computer, the replacement control token tracking value in the token service computer; and
   generating, by the server computer, a replay attack alert message comprising at least the replacement control token tracking value.

2. The method of claim 1 further comprising:
   if the first control token tracking value and the second control token tracking value match, storing, by the server computer, the first current token tracking value as a subsequent stored control token tracking value in the token service computer.

3. The method of claim 2, wherein the subsequent stored control token tracking value is utilized during a subsequent request message.

4. The method of claim 1 further comprising:
   if the first control token tracking value and the second control token tracking value do not match, determining, by the server computer, that the first current token tracking value is out of sequence; and
   transmitting, by the server computer, a token tracking value request message to the token requestor computer, the token tracking value request message including a request for a new current token tracking value.

5. The method of claim 1, wherein the request message is received during an interaction between a user of the user device and a resource provider, and wherein after determining that the user device is the malicious user device performing a replay attack, the method further comprises:
   generating, by the server computer, an authorization response message comprising an indication that the interaction is not authorized.

6. The method of claim 1, wherein determining the second function index value further comprises:
   determining, by the server computer, the second function index value based on a digit of a current time.

7. The method of claim 1, wherein the request message is an authorization request message received during an interaction between a user of the user device and a resource provider, and the response message is a modified authorization request message, wherein the method further comprises:
   transmitting, by the server computer, the modified authorization request message to an authorizing entity computer, wherein the authorizing entity computer determines whether or not to authorize the interaction.

8. The method of claim 1, wherein the request message further comprises a token.

9. The method of claim 8, wherein the request message is an authorization request message, the authorization request message further comprising a transaction amount.

10. The method of claim 9, wherein the token requestor computer is operated by a merchant.

11. A server computer comprising:
    a processor; and
    a non-transitory computer-readable medium coupled to the processor, the non-transitory computer-readable medium comprising code executable by the processor for implementing a method comprising:
    receiving a request message from a token requestor computer on behalf of a user device, the request message comprising a first control token tracking value, a first current token tracking value and a first function index value;
    determining a second function index value;
    comparing the first function index value to the second function index value;
    if the first function index value and the second function index value match, retrieving a second control token tracking value from storage in a token service computer, and determining a function based on the first function index value and a stored function table associated with the user device;

determining a second current token tracking value based on the function;

comparing the first current token tracking value to the second current token tracking value; and generating a response message in response to the comparing, and wherein the method further comprises:

in response to determining that the first current token tracking value matches the second current token tracking value, comparing, by the server computer, the first control token tracking value to the second control token tracking value;

comparing the first current token tracking value and the second control token tracking value; and if the first current token tracking value and the second control token tracking value match, then determining that the user device is a malicious user device;

generating a replacement control token tracking value;

storing the replacement control token tracking value in the token service computer; and generating a replay attack alert message comprising at least the replacement control token tracking value.

12. The server computer of claim 11, wherein the non-transitory computer-readable medium further comprises:
a function table module;
a function index value module; and
a token tracking value module.

13. The server computer of claim 11, wherein the server computer is a network processing computer.

14. The server computer of claim 11, wherein the request message is an authorization request message received during an interaction between a user of the user device and a resource provider, and the response message is a modified authorization request message, wherein the method further comprises:

transmitting the modified authorization request message to an authorizing entity computer, wherein the authorizing entity computer determines whether or not to authorize the interaction; and receiving an authorization response message from the authorizing entity computer, wherein the authorization response message comprises at least an indication of whether or not the interaction is authorized.

15. The server computer of claim 14, wherein the method further comprises:

transmitting the authorization response message to the token requestor computer via a transport computer and a resource provider computer associated with the resource provider.

16. The server computer of claim 15, wherein the authorization request message further comprises.

17. The server computer of claim 16, wherein the method further comprises:

providing a token to the token service computer; and receiving user credentials associated with the token from the token service computer.

18. The server computer of claim 17, wherein the modified authorization request comprises the user credentials.

19. The server computer of claim 11, wherein determining the second function index value further comprises:

determining the second function index value based on a hundredths digit of a current time.

* * * * *